M. G. SEMPER.
ROTARY KILN.
APPLICATION FILED JUNE 17, 1908.
909,464.
Patented Jan. 12, 1909.
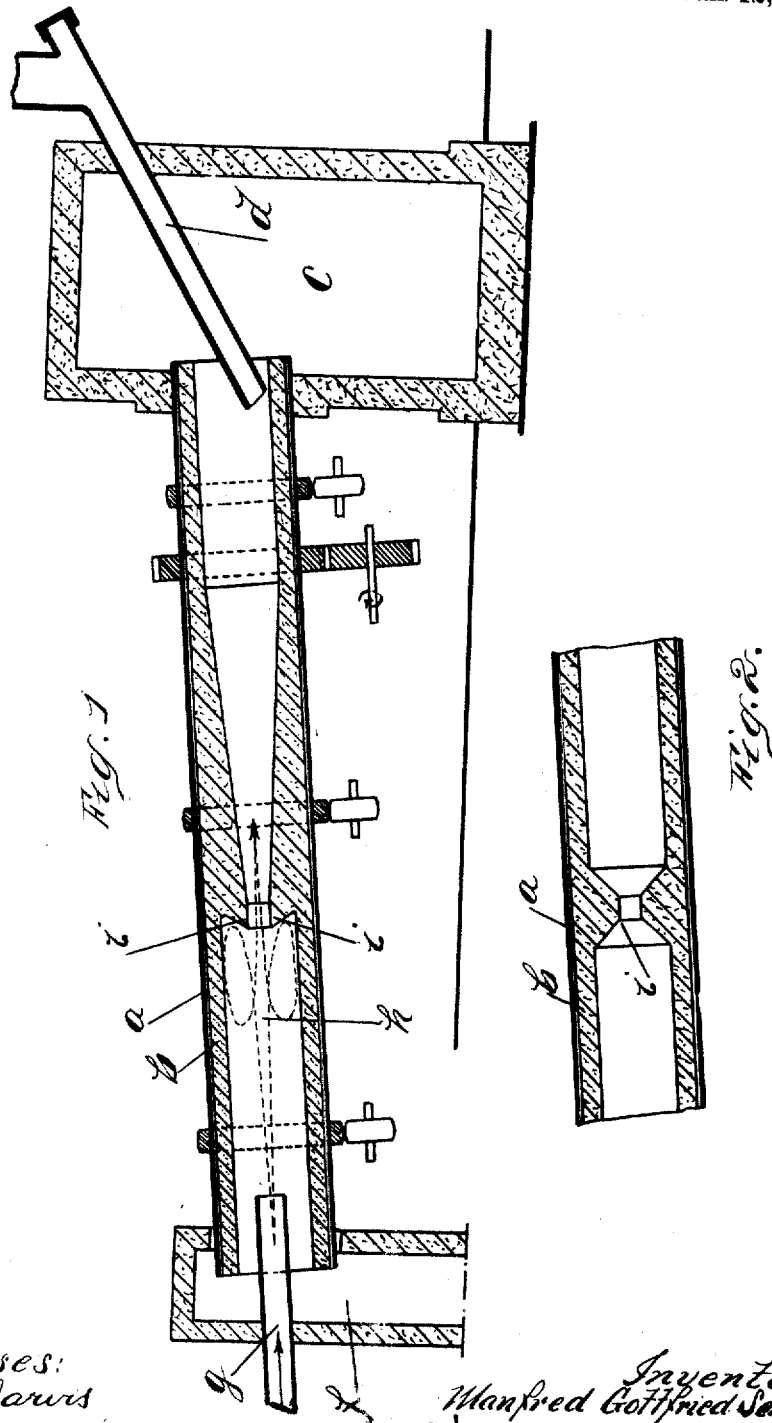
Witnesses:
C. A. Jarvis
Adam Cheivek
Inventor:
Manfred Gottfried Semper
By ———
Attorney.

UNITED STATES PATENT OFFICE.

MANFRED GOTTFRIED SEMPER, OF WEFERLINGEN, GERMANY.

ROTARY KILN.

No. 909,464.

Specification of Letters Patent.

Patented Jan. 12, 1909.

Application filed June 17, 1908. Serial No. 438,911.

*To all whom it may concern:*

Be it known that I, MANFRED GOTTFRIED SEMPER, engineer, citizen of the Swiss Confederation, residing at Weferlingen, Province of Saxony, Germany, have invented new and useful Improvements in Rotary Kilns, of which the following is a specification.

This invention relates to a process and apparatus for producing as high temperatures as possible in rotary kilns heated by gas.

The object of the process forming the subject-matter of the present application is to heat rotary kilns by means of gas by compelling the gases repeatedly to pass through the clinker zone or to form eddies in order thus to obtain a comparatively high temperature over a short distance, flames being freely produced.

In order to make this process profitable the rotary kilns must be suitably modified by very materially reducing the cross-sectional area of the end of the clinker zone, where a contracted place is formed. The gases which rush through the kiln at a high rate of speed meet at the place of contraction, rebound and cause eddies in the clinker zone, said eddies producing a high temperature.

In the accompanying drawings Figure 1 shows a longitudinal section through the kiln, and Fig. 2 a modified form of the contracted part of the kiln.

The rotary kiln *a* is lined with refractory material *b* in a well known manner and opens into a flue *c* through which runs the feed-pipe *d*. At the front end of the rotary kiln is the discharge-chamber *f* through which the gas admission-pipe *g* is led into the kiln. The clinker zone *h* situate in the front part of the kiln terminates at the contracted place *i*. The shape of this contracted part may vary. For instance the front surface may be conical and slope from the center backwards towards the rear end of the kiln, so that the contracted passage of the kiln is undercut at that point, as shown in Fig. 1, the result of which is that the gas is deviated as much as possible. The conical front surface may also slope from the center forwards, as shown in Fig. 2, whereby eddies will also be produced in the clinker zone. The back portion of the contracted part either slopes back steeply, that is, at a considerable angle to the longitudinal axis of the kiln, as shown in Fig. 2, or it slopes back gently, as shown in Fig. 1, whereby a long incline is provided along which the material under treatment passes into the clinker zone without falling into a dead space, that is, a space in which it remains unaffected.

The material runs into the rotary kiln through the pipe *d* in a well known manner and leaving the calcining zone traverses the place of contraction and enters the clinker zone. Gas is supplied from the opposite end of the kiln and the clinkering of the material is accomplished by the eddies produced in the clinker zone after which the material is run off in the ordinary manner.

The construction of the contracted part of the kiln may vary, but it is essential that it be situated at the end of the clinker zone so that the gases are made to eddy.

What I claim as my invention and desire to secure by Letters Patent is:—

1. A rotary kiln, comprising a plurality of chambers in communication, one of said chambers being larger than the others, means adapted to introduce a current of gas into said larger chamber, and means in said larger chamber adapted to obstruct the passage of the gas, said means comprising a conical baffle the apex of which faces the current of gas.

2. A rotary kiln, comprising a plurality of chambers in communication, one of said chambers being larger than the others, and means adapted to introduce a current of gas into said larger chamber, said larger chamber, at the end adjacent its connections with the smaller chamber, being conically recessed and adapted to obstruct the passage of the gas.

MANFRED GOTTFRIED SEMPER.

Witnesses:
D. RICHARD ROBINOW,
ERNEST H. L. MUMMENHOFF.